United States Patent
Giverts et al.

(10) Patent No.: US 10,678,827 B2
(45) Date of Patent: Jun. 9, 2020

(54) SYSTEMATIC MASS NORMALIZATION OF INTERNATIONAL TITLES

(71) Applicant: Workday, Inc., Pleasanton, CA (US)

(72) Inventors: Vladimir Giverts, San Francisco, CA (US); Parag Avinash Namjoshi, Foster City, CA (US); Pavan Boob, Daly City, CA (US); Kristy Gateley, San Francisco, CA (US); Xiao Fan, San Francisco, CA (US); Michael Au, Concord, CA (US)

(73) Assignee: Workday, Inc., Pleasanton, CA (US)

( * ) Notice: Subject to any disclaimer, the term of this patent is extended or adjusted under 35 U.S.C. 154(b) by 377 days.

(21) Appl. No.: 15/055,287

(22) Filed: Feb. 26, 2016

(65) Prior Publication Data

US 2017/0249383 A1   Aug. 31, 2017

(51) Int. Cl.
| | |
|---|---|
| G06F 16/35 | (2019.01) |
| G06F 16/21 | (2019.01) |
| G06F 16/33 | (2019.01) |
| G06Q 50/00 | (2012.01) |
| G06Q 10/10 | (2012.01) |
| G06F 40/58 | (2020.01) |
| G06F 40/284 | (2020.01) |
| G06F 40/289 | (2020.01) |

(52) U.S. Cl.
CPC ............ *G06F 16/35* (2019.01); *G06F 16/214* (2019.01); *G06F 16/3337* (2019.01); *G06F 40/284* (2020.01); *G06F 40/289* (2020.01); *G06F 40/58* (2020.01); *G06Q 10/10* (2013.01); *G06Q 50/01* (2013.01)

(58) Field of Classification Search
CPC ........ G06F 16/13; G06F 16/35; G06F 16/215; G06F 16/285; G06F 16/355; G06F 16/24575; G06F 16/24578; G06F 16/90344; G06F 40/216; G06F 40/295; G06Q 50/01
See application file for complete search history.

(56) References Cited

U.S. PATENT DOCUMENTS

| | | | | |
|---|---|---|---|---|
| 5,890,103 | A | | 3/1999 | Carus |
| 6,006,221 | A | * | 12/1999 | Liddy ............... G06F 17/30011 |
| 6,963,871 | B1 | * | 11/2005 | Hermansen ....... G06F 17/30634 |
| 7,099,886 | B2 | | 8/2006 | Lipe |
| 7,440,889 | B1 | * | 10/2008 | Skiena .................. G06F 17/274 |
| | | | | 379/93.01 |
| 8,712,776 | B2 | * | 4/2014 | Bellegarda .............. G10L 13/08 |
| | | | | 704/258 |
| 8,781,810 | B2 | * | 7/2014 | Cancedda ........... G06F 17/2881 |
| | | | | 704/2 |
| 8,855,998 | B2 | * | 10/2014 | Gillam .............. G06F 16/90344 |
| | | | | 704/9 |

(Continued)

*Primary Examiner* — Belix M Ortiz Ditren
*Assistant Examiner* — Mellissa M. Ohba
(74) *Attorney, Agent, or Firm* — Van Pelt, Yi & James LLP

(57) ABSTRACT

A system for generating a database of labeled foreign canonical titles includes an interface and a processor. The interface is to receive a title in a second language. The processor is to 1) store a set of n-grams in a first language in a first database; 2) sanitize the title into a sanitize title in the second language; 3) translate the sanitized title into a translated title in the first language; 4) break the translated title into n-grams; 5) determine labels for the n-grams using the first database; and 6) determine label to associate with the title.

20 Claims, 10 Drawing Sheets

(56) References Cited

U.S. PATENT DOCUMENTS

| | | | |
|---|---|---|---|
| 9,245,278 B2 * | 1/2016 | Orsini | G06F 17/2854 |
| 9,336,206 B1 * | 5/2016 | Orsini | G06F 17/2854 |
| 9,342,592 B2 * | 5/2016 | Giverts | G06F 16/35 |
| 9,448,996 B2 * | 9/2016 | Orsini | G06F 17/2854 |
| 9,588,966 B2 * | 3/2017 | Eck | G06F 17/28 |
| 9,659,313 B2 * | 5/2017 | Tsai | G06Q 30/0255 |
| 2007/0112763 A1 * | 5/2007 | Broder | G06F 17/2785 |
| 2008/0016112 A1 * | 1/2008 | Reddy | G06F 9/454 |
| 2009/0150145 A1 | 6/2009 | Magdalen | |
| 2009/0222441 A1 * | 9/2009 | Broder | G06F 17/2785 |
| 2013/0030787 A1 * | 1/2013 | Cancedda | G06F 17/2881 |
| | | | 704/2 |
| 2013/0110497 A1 | 5/2013 | Medero | |
| 2015/0032747 A1 | 1/2015 | Giverts | |
| 2015/0161107 A1 | 6/2015 | Tur | |
| 2015/0262209 A1 * | 9/2015 | Orsini | G06F 17/2854 |
| | | | 705/14.11 |

* cited by examiner

| Job Title | Job Function | Seniority | Specialization | Category |
|---|---|---|---|---|
| Clinical Nurse Assistant Pediatrics | Nursing | Low | Clinical, Pediatrics | Healthcare |

FIG. 2

| Job Title | Job Function | Seniority | Specialization | Category |
|---|---|---|---|---|
| Soins Infirmiers Pédiatrie | Hospital Staff | | Pediatrics | Healthcare |
| Infirmiers Pédiatrie D'urgence | Hospital Staff | | Emergency Medicine, Pediatrics | Healthcare |

FIG. 6

SYSTEMATIC MASS NORMALIZATION OF INTERNATIONAL TITLES

BACKGROUND OF THE INVENTION

Social networks have become repositories for massive quantities of personal data, including users' job titles, skills and qualifications, current and previous employers, education, and other information. A key impediment to effectively using this data, however, is that the data can be entered by users into their network profiles in any format and language. The lack of standardization makes it difficult to search, analyze, and aggregate the data. A prerequisite for effectively searching, analyzing, and aggregating the data is the ability to recognize data variants, including variants in different languages, that are semantically equivalent.

In one approach for identifying data variants that are semantically equivalent, data from different languages is treated independently and a person manually reviews for each language a collection of user-entered data, define a data term or phrase that is representative of multiple variants of user-entered data, and create a look-up table that maps the user-entered data to a representative data term or phrase for each language. However, this approach can be extremely time-consuming and the results may be limited to user-entered data variants that have been manually mapped.

BRIEF DESCRIPTION OF THE DRAWINGS

Various embodiments of the invention are disclosed in the following detailed description and the accompanying drawings.

FIG. 2 is a table of exemplary data stored in a database of labeled canonical titles.

FIG. 6 is a table of exemplary data stored in a database of labeled n-grams.

DETAILED DESCRIPTION

Figure 1A:
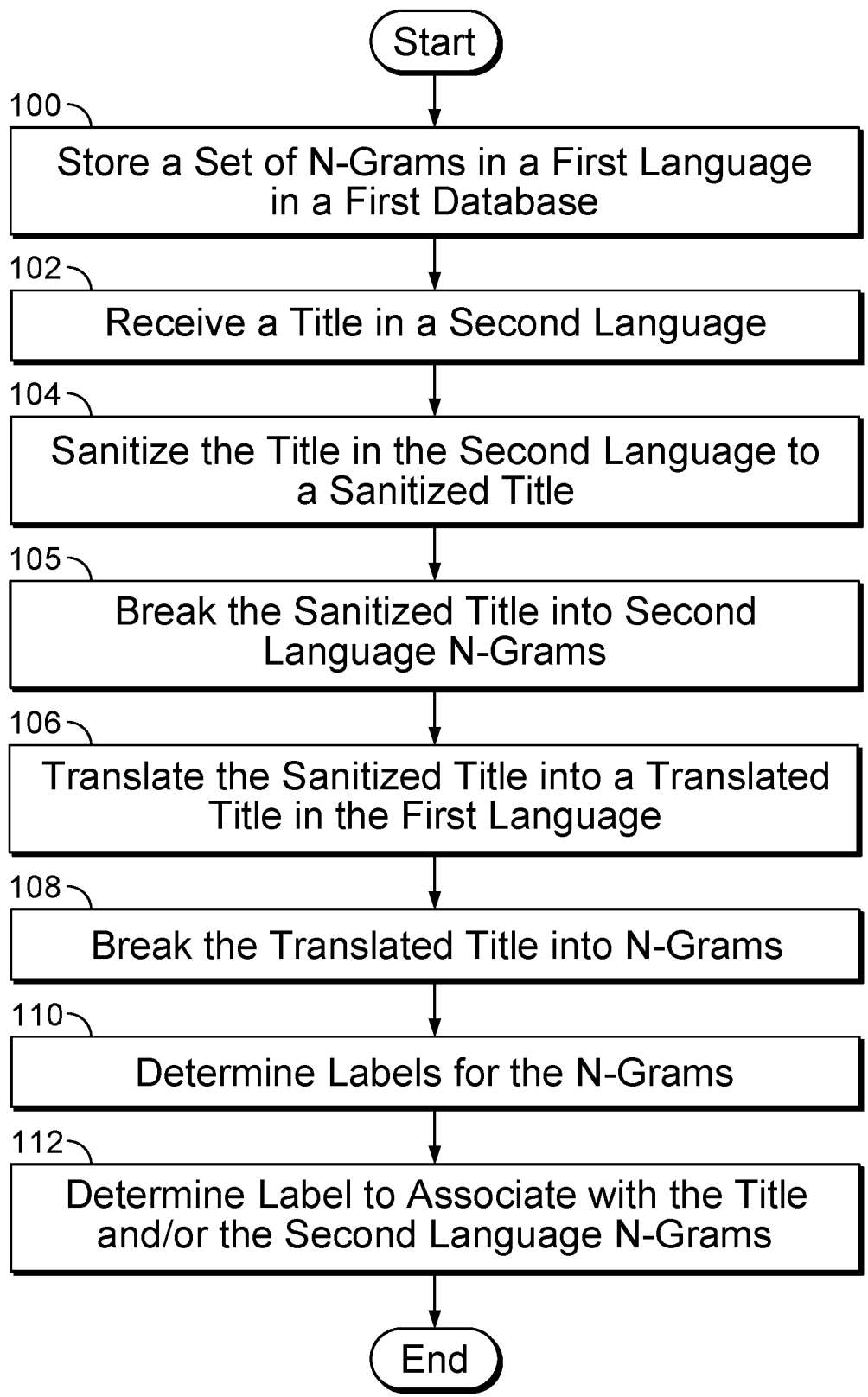
FIG. 1A is a flow diagram illustrating an embodiment of a process for generating a database of labeled foreign canonical titles.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for generating a database of labeled foreign titles is disclosed. The system comprises an interface and a processor. The processor is to store a set of n-grams each with associated labels in a first language in a first database. The processor is further to sanitize a title in a second language into a sanitized title; to translate the sanitized title into a translated title in the first language; to break the translated title into n-grams; determine labels for the n-grams using the first database; and determine labels to associate with the title.

In some embodiments, the system uses a first database of titles or n-grams with associated labels and attributes in a first language to generate a second database that is used to associate a second language title to a set of labels and/or second language n-grams. The second database enables searching, given a second language title or second language n-grams, for a standardized title, a set of labels, or a set of attributes. In some embodiments, the first language comprises a native or reference language (e.g., English). In some embodiments, the second language comprises a foreign language (e.g., French).

In some embodiments, a system for generating a database of labeled foreign n-grams is disclosed. The system comprises a processor. The processor is to store in a first database of labeled foreign titles a set of foreign titles, each foreign title associated with a set of attributes, and a set of labels assigned to each of the attributes. For each foreign title, the processor is to generate a set of foreign n-grams based on the foreign titles. For each foreign n-gram, the processor is to determine a set of parent n-grams wherein each parent n-gram is a superset of the intermediary n-gram; and for each parent n-gram, the processor is to retrieve the labels assigned to each attribute of the parent n-gram. The processor is to assign a set of inherited labels to the intermediary n-gram based on a matching characteristic applied to the retrieved labels and the parent n-grams.

In some embodiments, a system generates a database of labeled foreign canonical titles. For example, the system stores a first database of labeled canonical titles. The database stores a set of canonical titles, each canonical title associated with a set of n-grams, a set of attributes, and a set of labels assigned to each of the attributes. In one example, the titles are sanitized personal data, such as a user's job title, submitted to a social network. In the example, the canonical title is a sanitized version of a user's job title. The canonical title is broken down into a set of n-grams. In some embodiments, an n-gram comprises a set of one or more contiguous words within a title. In the preceding example, attributes and labels are assigned to each n-gram. In some embodiments, an attribute represents one aspect of the semantics of a title. In some embodiments, a label is a word or phrase that is assigned to an attribute and provides information related to that attribute. Together, the labels and attributes capture semantic information about a title. In some embodiments, a canonical title comprises a title that is used to represent a set of semantically similar raw titles. The database of labeled foreign canonical titles is generated by clustering job titles based on similarity of the attribute labelings of their n-grams, then for each cluster selecting the raw job title that occurs most frequently in the input data. In some embodiments, similarity is a weighted measure, as some attributes may be more semantically valuable than others (e.g., job function may be more meaningful than seniority).

In some embodiments, a system generates a database of labeled foreign titles by receiving a raw title in a second language different from a language used in the stored database of labeled native n-grams. As one example, the database of labeled n-grams stores n-grams in American English and the raw title is in French. The system improves the efficiency in generating a database of labeled French canonical titles by relying on a first database of labeled American English n-grams. In some embodiments, if required, the raw title is sanitized but remains in the second language. In some embodiments, once a title is sanitized, it is translated to the language used by the database of labeled native titles, and this translated title is broken into n-grams. In the preceding example, the sanitized French title is translated into American English. This translated title is then broken into native n-grams. The database of labeled native n-grams is accessed using the native n-grams obtained from the translation. As one example, the raw French job title "Directrice Adjointe des Soins Infirmiers, de Pédiatrie" is sanitized to the French title "Directrice Adjointe Soins Infirmiers Pédiatrie" and translated into the American English title "Nursing Assistant Director Pediatrics." This is then broken into the n-grams "Nursing Assistant", "Director", and "Pediatrics." The database of labeled native n-grams in American English is accessed using the American English n-grams "Nursing Assistant", "Director", and "Pediatrics."

In some embodiments, a representative foreign title is selected from the database of labeled foreign titles. In some embodiments, the representative title is selected based on how well the translated title matches with a native title. For example, a perfect match in the previous example occurs if there exists a canonical title "Nursing Assistant Director Pediatrics" in the database of labeled native titles. In some embodiments, the set of labels associated with the selected representative title is assigned to the raw foreign title and stored with the raw title in a database of labeled foreign canonical titles. For example, the labels associated with the native title "Nursing Assistant Director Pediatrics" are assigned and stored in a database of labeled French canonical titles with the raw French title "Directrice Adjointe des Soins Infirmiers, de Pédiatrie." In some embodiments, the sanitized foreign title is stored with the labels instead of or in addition to the raw foreign title.

In some embodiments, a system generates a database of labeled n-grams. For example, the system stores a database of labeled foreign titles. The database stores a set of foreign titles, each foreign title associated with a set of foreign n-grams, a set of attributes, and a set of labels assigned to each of the attributes. In some embodiments, the database of labeled foreign titles is generated using the techniques described above. In some embodiments, the database of labeled foreign titles is populated with labeled titles by translating a raw title into a native language to access a database of labeled native titles in a native language for appropriate labels.

In some embodiments, for each foreign n-gram in the database of labeled foreign titles, a set of intermediary n-grams is generated. As one example, the intermediary n-grams associated with the n-gram "Soins Infirmiers Pédiatrie" include the n-grams "Soins Infirmiers," "Infirmiers Pédiatrie," "Soins," "Infirmiers," and "Pédiatrie." As another example, the intermediary n-grams associated with the n-gram "Infirmiers Pédiatrie D'urgence" include the n-grams "Infirmiers Pédiatrie," "Pédiatrie D'urgence," "Infirmiers," "Pédiatrie," and "D'urgence." For each intermediary n-gram, a set of parent n-grams is determined. The parent n-grams are each a superset of the intermediary n-gram. Continuing the above example, the parent n-grams of intermediary n-gram "Infirmiers Pédiatrie" are parent n-grams "Soins Infirmiers Pédiatrie" and "Infirmiers Pédiatrie D'urgence." The labels assigned to the parent n-grams are retrieved and a matching characteristic is applied to the retrieved labels. A set of inherited labels is assigned to an intermediary n-gram based on the matching characteristics of each label. In the example, the labels for parent n-grams "Soins Infirmiers Pédiatrie" and "Infirmiers Pédiatrie D'urgence" that meet a matching characteristic form a set of inherited labels and are assigned to the intermediary n-gram "Infirmiers Pédiatrie." In some embodiments, the matching characteristic determines which labels exist in all of the parent n-grams. In various embodiments, the matching characteristic is based on the frequency a label exists in each of the parent n-grams. In some embodiments, the set of intermediary n-grams and inherited labels is stored in a database of labeled foreign n-grams.

According to the various examples, there may be two complementary aspects for title normalization of foreign languages. In the first aspect, starting with an existing database of labeled n-grams in a reference language, a database of labeled titles may be generated for a foreign language. This process relies on the translation of a foreign title into the reference language. Using the first aspect, raw titles in a foreign language are processed to populate a database of labeled foreign titles. In a second aspect, once the database of labeled foreign titles is generated, it can be used to generate a database of labeled foreign n-grams. This process relies on a matching characteristic to determine the inherited labels to assign to the intermediary foreign n-grams. Once a database of labeled n-grams has been generated and validated, it can be used by an n-gram label matching algorithm to quickly map labels to new foreign titles, and to map new foreign titles to existing canonical titles on the basis of label similarities, thus enabling efficient search, analysis, and aggregation of new titles in a foreign language.

In some embodiments, labels for a new foreign title not already stored in the second database of foreign titles can be generated by generating a set of foreign n-grams for the new foreign title; searching the second database of labeled foreign titles for one or more stored n-grams that match one or more generated n-grams; and for each matched stored n-gram and matched generated n-gram: 1) retrieving the labels assigned to each attribute of the matched stored n-gram; 2) assigning the retrieved labels to one or more attributes of the matched generated n-gram; and 3) assigning the retrieved labels to one or more attributes of the new foreign title.

In some embodiments, each of the foreign n-grams includes one or more contiguous words in the foreign title. In some embodiments, generating a set of foreign n-grams for the foreign title comprises: 1) generating a set of foreign unigrams, wherein each foreign unigram is one word in the translated title; 2) generating a set of foreign bi-grams, wherein each foreign bi-gram is two contiguous words in the foreign title; and 3) generating a set of foreign tri-grams, wherein each foreign tri-gram is three contiguous words in the foreign title.

FIG. 1A is a flow diagram illustrating an embodiment of a process for generating a database of labeled foreign titles. In the example shown, in 100 a set of native n-grams is stored in a first language in a first database. For example, a set of native n-grams is stored in database—for example, a database includes n-grams derived from a standard set of titles in English. In some embodiments, the set of n-grams comprises a set of unigrams, a set of bi-grams, or a set of tri-grams. In some embodiments, each unigram is one word in a title, each bi-gram is two contiguous words in the title; and each tri-gram is three contiguous words in the title. In some embodiments, the first database stores a set of attributes associated with a native n-gram of the set of native n-grams. In some embodiments, the first database stores a set of labels assigned to an attribute of the set of attributes. In 102, a title is received in a second language. For example, a title is received in another language (e.g., in French). In some embodiments, the system or processor produces a second database of labeled titles in the second language. In some embodiments, producing the second database comprises generating a set of second language n-grams for the title in the second language. In some embodiments, generating a set of second language n-grams for the title comprises: generating a set of second language unigrams, wherein each second language unigram is one word in the title; generating a set of second language bi-grams, wherein each second language bi-gram is two contiguous words in the title; and generating a set of second language tri-grams, wherein each second language tri-gram is three contiguous words in the title. In some embodiments, the second database stores the set of second language n-grams for the title in the second language. In some embodiments, the second database stores a set of attributes associated with the title in the second language. In some embodiments, the second database stores a set of labels assigned to an attribute of the set of attributes. In some embodiments, the first language and the second language are different. In 104, the title in the second language is sanitized to a sanitized title. In various embodiments, sanitizing the title comprises one or more of the following: removing stop words, filtering characters, removing accents from characters, tokenizing the title, or any other appropriate processing. In various embodiments, tokenizing the title utilizes one or more of the following: word boundaries, whitespace, a dictionary, or any other appropriate processing. In some embodiments, sanitizing the title comprises filtering tokens. In various embodiments, filtering tokens comprises identifying articles, conjunctions, or other parts of speech. In 105 the sanitized title is broken into second language n-grams. In 106, the sanitized title is translated into a translated title in the first language. In 108, the translated title is broken into n-grams. In 110, labels are determined for the n-grams. In 112, a label is determined to associate with the title and/or the second language n-grams.

Figure 1B:
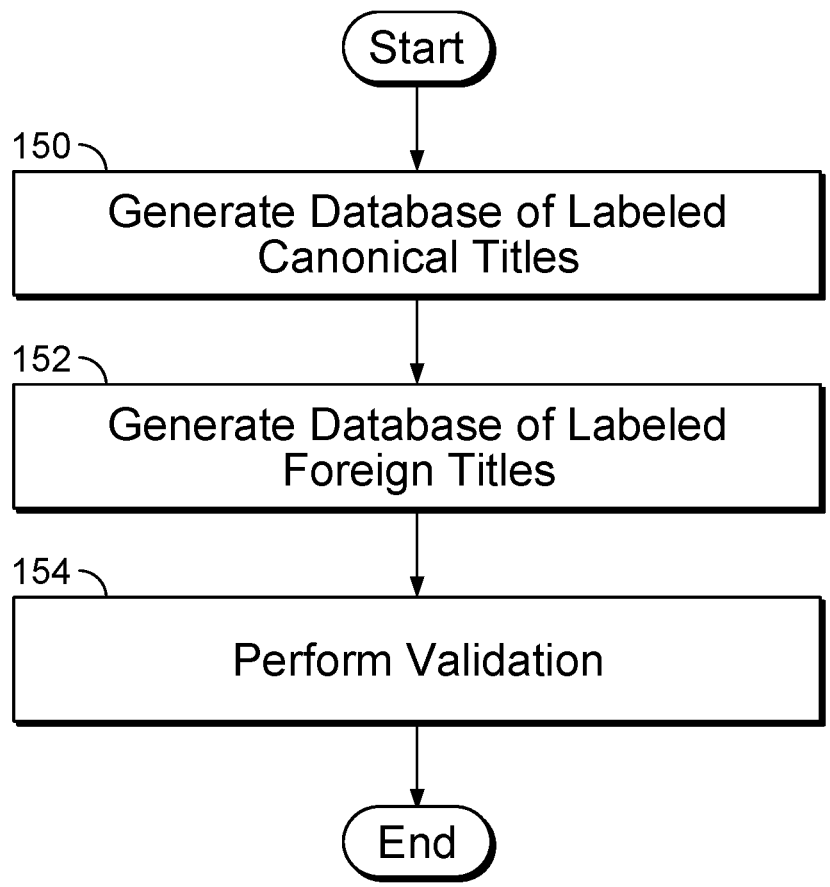
FIG. 1B is a flow diagram illustrating an embodiment of a process for generating and validating a database of labeled foreign titles.

FIG. 1B is a flow diagram illustrating an embodiment of a process for generating and validating a database of labeled foreign titles. In the example shown, in 150, a database of labeled native titles is generated. In some embodiments, this database is generated by translating foreign titles into a native language; breaking down the translated titles into native n-grams; and looking up labels in a first database of labeled native n-grams. For example, a database of labeled native titles is generated for the job titles in American English. In some embodiments, the database of 150 stores a set of native titles where each native title is associated with a set of native n-grams, a set of machine-readable attributes, and a set of machine-readable labels assigned to each of the canonical attributes. In various embodiments, the native n-grams comprise a set of native unigrams, a set of native bi-grams, a set of native tri-grams, or any other appropriate n-gram or combination of n-grams. In some embodiments, each native unigram is one word in the native title, each native bi-gram is two contiguous words in the native title; and each tri-gram is three contiguous words in the native title.

In the example shown in FIG. 1B, in 152, a database of labeled foreign titles is generated. As an example, a set of raw job titles in the French language is processed to generate a database of labeled French titles. In 154, validation is performed. Techniques for performing the validation of 154 include both white-box and black box-validation. In some embodiments, the validation provides feedback to determine the accuracy of the labeled foreign title database generated in 152. In some embodiments, the feedback from 154 is used to improve the accuracy achieved in 152. In some embodiments, the feedback is used to adjust the matching characteristic and other labeling parameters used in 152.

FIG. 2 is a table of exemplary data stored in a database of labeled titles. In the example shown, the database stores data for American English titles. Stored along with each title are identified attributes and labels. The attributes and labels provide semantic meaning to the title and are used to determine equivalent titles. In the example shown, the title "Clinical Nurse Assistant Pediatrics" is a job title. The attributes are "Job Function," "Seniority," "Specialization," and "Category." The corresponding labels for the attributes are "Nursing," "Low," "Clinical" and "Pediatrics," and "Healthcare." As shown in the example, an attribute can have one or more labels. In the example shown, the attribute "Specialization" has two labels: "Clinical" and "Pediatrics." In some embodiments, certain attributes will not have a label when appropriate. In some embodiments, the job title is a sanitized title instead of a raw title.

Figure 3:
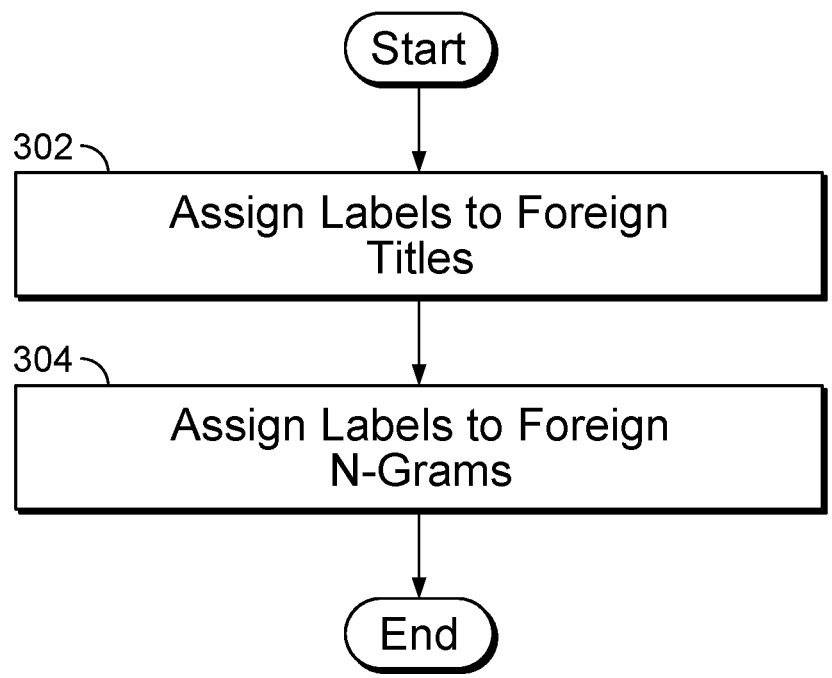
FIG. 3 is a flow diagram illustrating an embodiment of a process for generating a database of labeled foreign titles.

FIG. 3 is a flow diagram illustrating an embodiment of a process for generating a database of labeled foreign titles. In some embodiments, the process of FIG. 3 is used in block 104 of FIG. 1B once the database of block 102 of FIG. 1B is generated. In the example shown, in 302, labels are assigned to foreign titles. In 304, labels are assigned to foreign n-grams. Specific embodiments of 302 and 304 are described below with respect to FIGS. 4-7.

Figure 4:
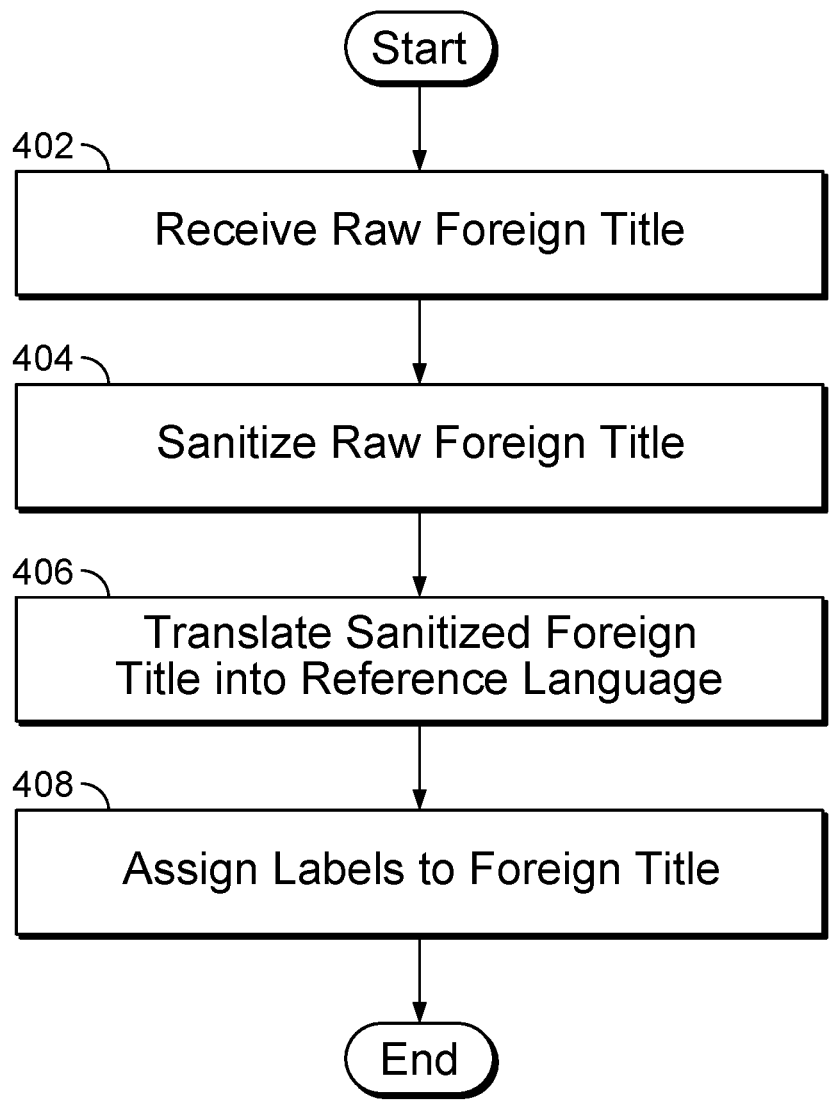
FIG. 4 is a flow diagram illustrating an embodiment of a process for assigning labels to foreign titles.

FIG. 4 is a flow diagram illustrating an embodiment of a process for assigning labels to foreign titles. In some embodiments, the process of FIG. 4 is used in 302 of FIG. 3. In the example shown, in 402 a raw foreign title is received. In 404, the raw foreign title is sanitized. For example, the sanitized process for a language with accent characters can include a step to remove accents from characters. In various embodiments, examples of sanitizing include removing stop words, filtering characters, removing accents from certain characters, tokenizing the raw title, filtering based on tokens, and any other appropriate techniques. Examples of filtering tokens include identifying and filtering articles and conjunctions. In some embodiments, when tokenizing the raw title, the tokens are determined based on word boundaries, whitespace, a dictionary, or other appropriate techniques. In some embodiments, the techniques for sanitizing and tokenizing the raw title is dependent on the language being processed. As one example, the raw French job title "Directrice Adjointe des Soins Infirmiers, de Pédiatrie" is sanitized to the French title "Directrice Adjointe Soins Infirmiers Pédiatrie" by removing stop words "des" and "de," removing the comma used for punctuation, and removing accents. In some examples, no sanitization is needed and the raw foreign title is used as the sanitized title.

In the example shown in FIG. 4, in 406, the sanitized foreign title of 404 is translated into the reference language. The reference language is the language the labeled native titles are stored. For example, in some embodiments, the reference language is the language native titles are stored in the database of 150 of FIG. 1B. As one example, the sanitized French title "Directrice Adjointe Soins Infirmiers Pédiatrie" is translated into the American English title "Nursing Assistant Director Pediatrics." In various embodiments, in 406, the sanitized title is translated using a dictionary, manually, or any appropriate other manner or combination thereof. In some embodiments, the translation is validated manually to ensure accuracy and depends on the accuracy of machine translation from the foreign to reference language.

In the example shown in FIG. 4, in 408, labels are assigned to the foreign title. In the example, the database of labeled native titles in American English is accessed using the translated American English title "Nursing Assistant Director Pediatrics." In some embodiments, the translated title is compared to the native titles stored in a database of labeled native titles such as database of 150 of FIG. 1B. In the event that a matching title is found, the labels of the matching native title are assigned to the foreign title. In some embodiments, the attributes corresponding to the labels are also assigned to the foreign title. As one example, the database of labeled native titles includes the native title "Nursing Assistant Director Pediatrics," which matches the foreign title of "Directrice Adjointe des Soins Infirmiers, de Pédiatrie." The labels and attributes associated with native title "Nursing Assistant Director Pediatrics" are assigned to the foreign title "Directrice Adjointe des Soins Infirmiers, de Pédiatrie." In some embodiments, the labels are assigned to the sanitized title (e.g., "Directrice Adjointe Soins Infirmiers Pédiatrie"). In some embodiments, the assigned labels, attributes, and foreign title are stored in a database of labeled foreign titles.

As a further example of assigning attributes and labels, a native title "Nursing Assistance Director Pediatrics" in American English has the attributes "Job Function," "Seniority," "Specialization," and "Category" with the corresponding respective labels "Hospital Staff," "High," "Pediatrics," and "Healthcare." The matching foreign title "Directrice Adjointe des Soins Infirmiers, de Pédiatrie" is assigned the same attributes and labels: attributes "Job Function," "Seniority," "Specialization," and "Category" with the corresponding respective labels "Hospital Staff," "High," "Pediatrics," and "Healthcare."

In some embodiments, the foreign title is converted to one or more foreign n-grams and n-gram label matching is used to determine the set of attributes and labels to assign the foreign title. In some embodiments, each of the foreign n-grams includes one or more contiguous words in the foreign title. In various embodiments, converting the foreign title to foreign n-grams includes generating a set of a set of foreign unigrams, a set of foreign bi-grams, a set of foreign tri-grams, or any other appropriate n-gram or combination of n-grams. (related to paragraph to the foreign)

Figure 5:
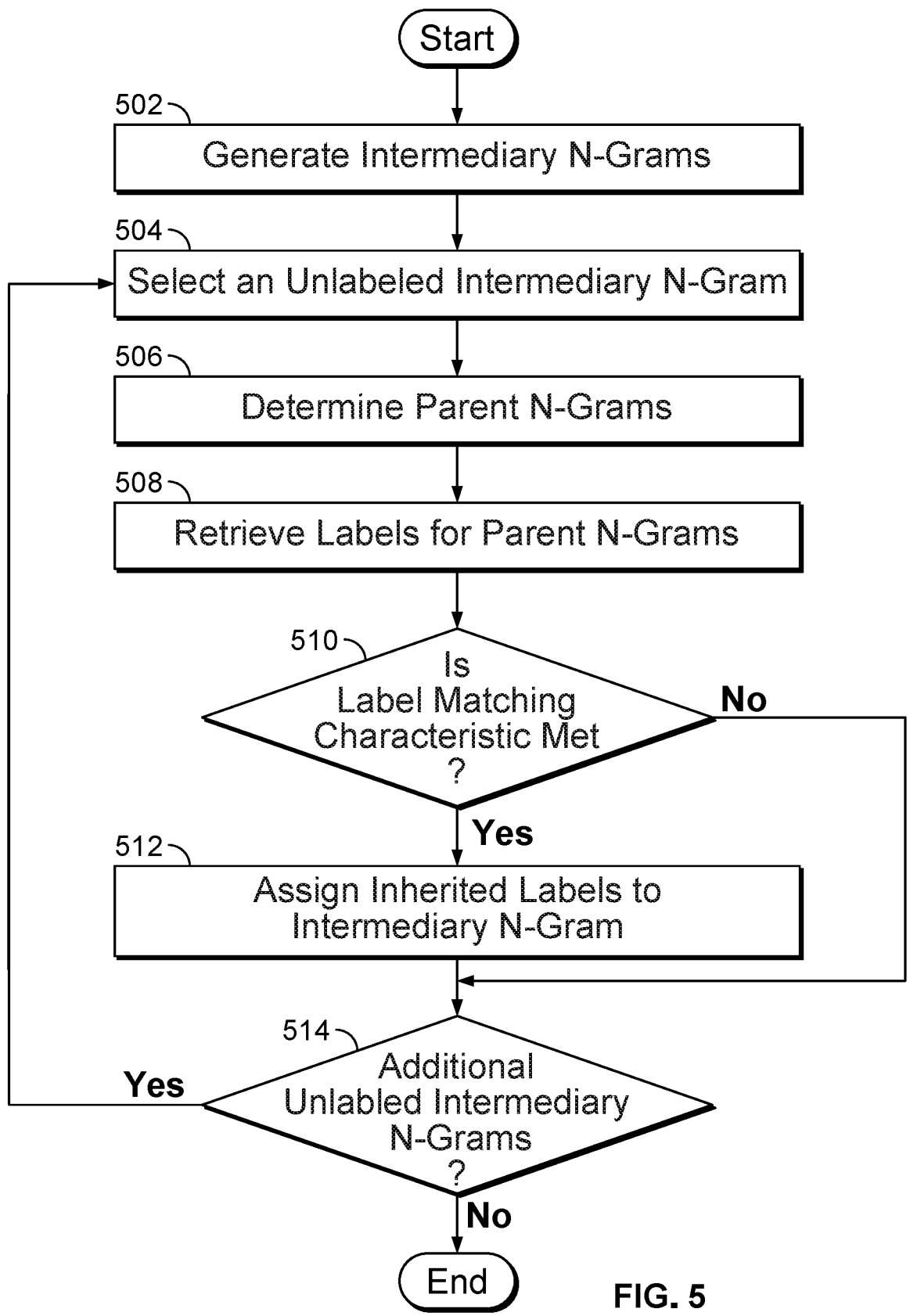
FIG. 5 is a flow diagram illustrating an embodiment of a process for assigning labels to n-grams.

FIG. 5 is a flow diagram illustrating an embodiment of a process for assigning labels to n-grams. In some embodiments, the process of FIG. 5 is used in block 304 of FIG. 3 to assign labels to foreign n-grams. In the example shown, in 502, a set of intermediary n-grams are generated. In some embodiments, the intermediary n-grams are generated from a database of foreign titles. The database stores a set of foreign titles, where each foreign title is associated with a set of foreign n-grams, a set of attributes, and a set of labels assigned to each of the attributes. In some embodiments, the foreign title is a foreign job title that may be sanitized and converted into an n-gram. In some embodiments, the source of labeled titles is provided by the result of block 302 in FIG. 3.

In some embodiments, an n-gram includes one or more contiguous words in a title, where the number of contiguous words ranges from 1 to n. For n=3, the set of n-grams may include sets of unigrams (single words), bi-grams (two contiguous words), and tri-grams (three contiguous words) contained in the title. The number of n-grams generated for each title may depend on the number of words in the title (x) and on the value of n. In general, for an x-word title, there may be x unigrams, (x−1) bi-grams, and (x−2) tri-grams, etc. (assuming x is sufficiently large).

In the example shown in FIG. 5, in 502, in some embodiments the generation of intermediary n-grams includes the generation of all n-grams for an x-word title from n=x−1 down to n=1. In some embodiments, the intermediary n-grams are generated starting with n-grams where n=x−1. In some embodiments, the intermediary n-grams are generated starting with tri-grams (n=3) and working down to unigrams (n=1). In various embodiments, the generation of n-grams begins at a predefined n and proceeds in steps by decrementing n by 1. The starting n can be tuned for the particular language. In various embodiments, n may be decremented until a threshold is reached or n=1. An example of generated intermediary n-grams is further described below with respect to FIG. 7.

In the example shown in FIG. 5, in 504, an unlabeled intermediary n-gram is selected from the set of intermediary n-grams generated in 502. As described later, block 504 is repeated for all unlabeled intermediary n-grams. In 506, the parent n-grams of the selected intermediary n-gram are determined. Each parent n-gram is a superset of the intermediary n-gram. In some embodiments, the parent n-grams are limited to n-grams that are one word longer than the intermediary n-gram and in some examples have an additional word either preceding or following the words of the intermediary n-gram. As one example, an intermediary n-gram with n=x has parent n-grams with n=x+1. In various embodiments, an intermediary n-gram is a strict sub-string of the parent n-gram. As an example, for the intermediary n-gram "Infirmiers Pédiatrie," two parent n-grams are tri-grams "Soins Infirmiers Pédiatrie" and "Infirmiers Pédiatrie D'urgence." The two parent n-grams both include as a sub-string the intermediary n-gram "Infirmiers Pédiatrie."

In the example shown in FIG. 5, in 508, the labels for each parent n-gram are retrieved. In the example above, the labels for parent tri-gram "Soins Infirmiers Pédiatrie" and "Infirmiers Pédiatrie D'urgence" are retrieved. As an example, the tri-gram "Soins Infirmiers Pédiatrie" contains the attributes "Job Function," "Specialization," and "Category" with the corresponding labels "Hospital Staff," "Pediatrics," and "Healthcare." The tri-gram "Infirmiers Pédiatrie D'urgence" contains the same attributes "Job Function," "Specialization," and "Category" with the corresponding labels "Hospital Staff," "Emergency Medicine" and "Pediatrics," and "Healthcare." Unlike the tri-gram "Soins Infirmiers Pédiatrie," the tri-gram "Infirmiers Pédiatrie D'urgence" contains an additional label for "Specialization" that is "Emergency Medicine." FIG. 6, described below, depicts this exemplary data, which may be stored in a database of labeled n-grams. In some embodiments, attributes exist but are only utilized where applicable. As an example, both tri-grams "Soins Infirmiers Pédiatrie" and "Infirmiers Pédiatrie D'urgence" have no labels for the "Seniority" attribute since none is appropriate.

In the example shown in FIG. 5, in 510, a matching characteristic is performed on the retrieved labels. In the event that the label meets the matching characteristic, in 512, the label is an inherited label and is assigned to the intermediary n-gram. In some embodiments, assigning the inherited label comprises associating the label to the attribute. As one example, the "Pediatrics" label is associated with the attribute "Specialization." In various embodiments, assigning an inherited label comprises storing the label in a database of labeled titles.

In the example shown in FIG. 5, 510 is performed on all the retrieved labels for the parent n-grams to determine whether the matching characteristic is met. In the event the matching characteristic is not met for a parent n-gram's label, that label is not assigned to the intermediary n-gram. In 514, it is determined whether additional unlabeled intermediary n-grams exist. In some embodiments, unlabeled intermediary n-grams exist in the event that an intermediary n-gram has not been assigned inherited labels and no matching characteristic has been performed on it. In the event that an unlabeled intermediary n-grams exists, one is selected in 504. In some embodiments, the process continues until matching characteristics are performed on all unlabeled intermediary n-grams. In various embodiments, the process concludes when a threshold has been reached. In some embodiments, an intermediary n-gram is not labeled if there are insufficient parent n-grams.

FIG. 6 is a table of exemplary data stored in a database of labeled n-grams. In some embodiments, the data of FIG. 6 is used for calculating the matching characteristic for a label. As described above in reference to FIG. 5, the table includes labels for job titles "Soins Infirmiers Pédiatrie" and "Infirmiers Pédiatrie D'urgence." The job titles are tri-grams since each contains three words. The tri-gram "Soins Infirmiers Pédiatrie" contains the attributes "Job Function," "Specialization," and "Category" with the corresponding labels "Hospital Staff," "Pediatrics," and "Healthcare." The tri-gram "Infirmiers Pédiatrie D'urgence" contains the same attributes "Job Function," "Specialization," and "Category" with the corresponding labels "Hospital Staff," "Emergency Medicine" and "Pediatrics," and "Healthcare." Both tri-grams have no labels for the attribute "Seniority." In the example, tri-grams "Soins Infirmiers Pédiatrie" and "Infirmiers Pédiatrie D'urgence" are parent n-grams to intermediary n-gram "Infirmiers Pédiatrie." In some embodiments, the matching characteristic for a label is based on how frequent the label occurs in the parent n-grams. In various embodiments, in the event that the frequency a label occurs among the parent n-grams exceeds a particular threshold, the label is inherited by the intermediary n-gram. In some embodiments, the threshold is represented by a percentage the label occurs in parent n-grams. In various embodiments, the threshold can be tuned so that labels that are most applicable to the intermediary n-gram rise to the level of significance and are inherited. In some embodiments, the threshold is determined empirically by performing the n-gram labeling process and validating results. In some embodiments, a minimum number of parent n-grams (e.g., two) are required for performing the matching characteristic in order to achieve a desired accuracy. In some embodiments, a maximum number of parent n-grams is used. In some embodiments, additional n-grams exceeding the maximum number do not increase the level of accuracy of inherit labels.

Returning to the example of FIG. 6, the example uses a threshold of 90% for the matching characteristic. The labels "Hospital Staff," "Pediatrics," and "Healthcare" occur in both parent n-grams, exceeding the matching characteristic threshold and are inherited by the intermediary n-gram "Infirmiers Pédiatrie." As a further example, the label "Emergency Medicine" for the attribute "Specialization" does not exceed a matching characteristic threshold and is not inherited. The intermediary n-gram is assigned the inherit labels "Hospital Staff," "Pediatrics," and "Healthcare" corresponding to the attributes "Job Function," "Specialization," and "Category."

Figure 7:
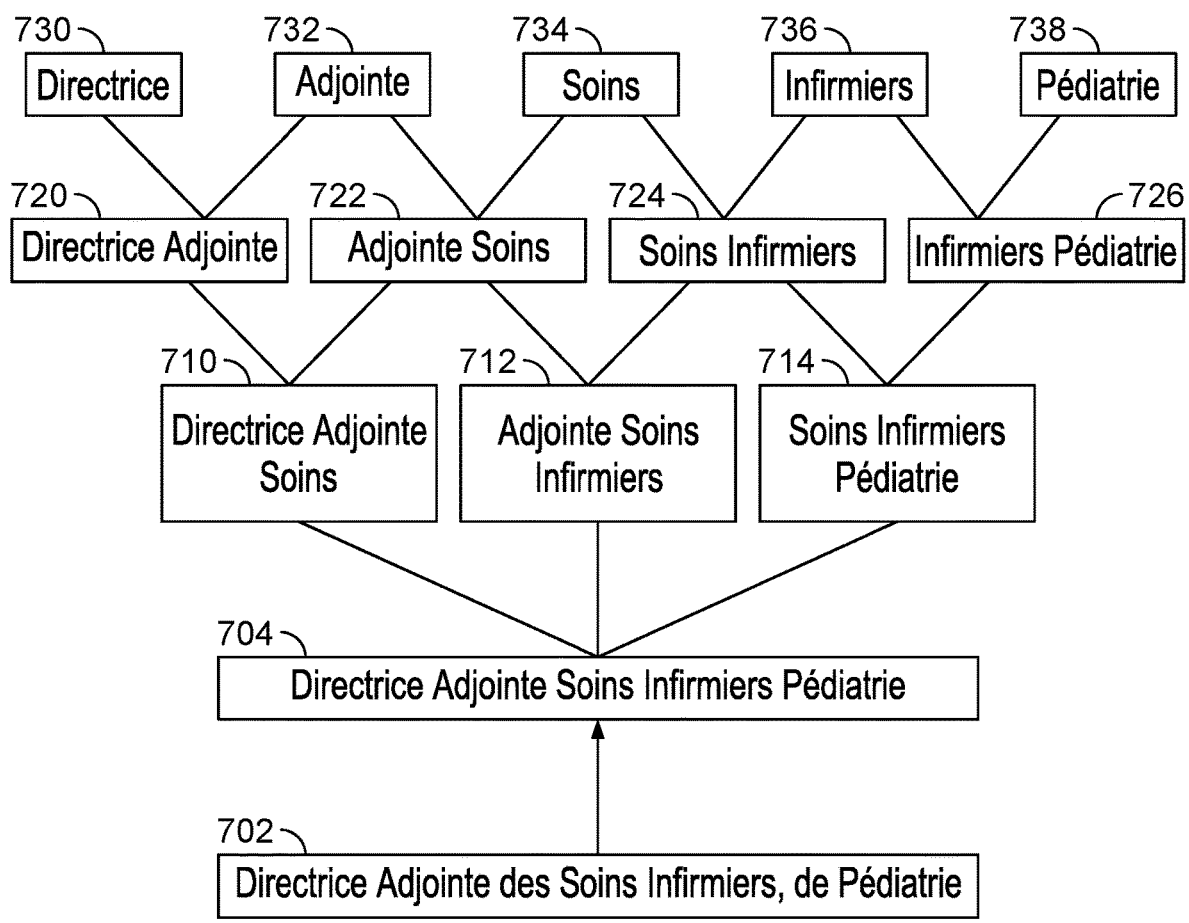
FIG. 7 is a diagram illustrating the generation of intermediary n-grams.

FIG. 7 is a diagram illustrating the generation of intermediary n-grams. In the example shown, 702 is the foreign title "Directrice Adjointe des Soins Infirmiers, de Pédiatrie." In the example shown, 704 is a sanitized title (e.g., "Directrice Adjointe Soins Infirmiers Pédiatrie") of canonical title 702. Sanitized title 704 is used to generate a set of intermediary n-grams 710, 712, 714, 720, 722, 724, 726, 730, 732, 734, 736 and 738. In the example, the intermediary n-grams range from tri-grams (n=3) to unigrams (n=1). The tri-grams are intermediary n-grams 710 ("Directrice Adjointe Soins"), 712 ("Adjointe Soins Infirmiers"), and 714 ("Soins Infirmiers Pédiatrie"). The bi-grams are intermediary n-grams 720 ("Directrice Adjointe"), 722 ("Adjointe Soins"), 724 ("Soins Infirmiers"), 726 ("Infirmiers Pédiatrie"). The unigrams are intermediary n-grams 730 ("Directrice"), 732 ("Adjointe"), 734 ("Soins"), 736 ("Infirmiers") and 738 ("Pédiatrie"). In some embodiments, the n-gram for an intermediary node is a sub-string of the parent n-gram. In some embodiments, each parent n-gram contains one more word than the intermediary n-gram. In some embodiments, the additional word either precedes or follows the words of the intermediary n-gram.

Figure 8:
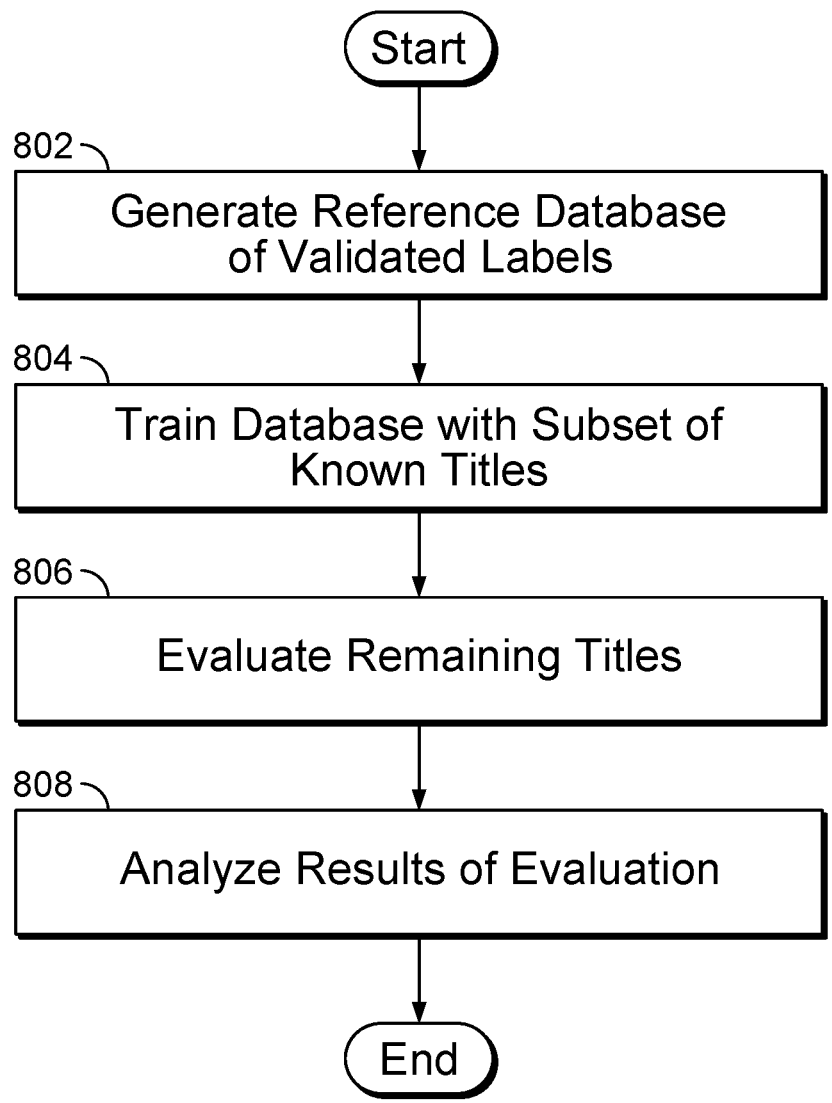
FIG. 8 is a flow diagram illustrating an embodiment of a process for performing validation of an n-gram labeling algorithm.

FIG. 8 is a flow diagram illustrating an embodiment of a process for performing validation of an n-gram labeling algorithm. In some embodiments, the process of FIG. 8 is used to validate the output of block 152 of FIG. 1B and the process of FIG. 3. In the example shown, in 802 a reference database of validated labels is generated. In some embodiments, the reference database is the result of block 150 of FIG. 1B. In various embodiments, the labels of the reference database are validated manually to ensure accuracy. In 804, a subset of the reference database of 802 is used to train a new database of titles. As one example, 20 percent of the labeled data of the reference database of 802 is used. In 804, the data of the reference database of 802 is converted to raw titles. The raw titles are received by an n-gram labeling process and used to populate a new database of titles. In some embodiments, the n-gram labeling process is the process described above and in FIGS. 1A-7. The result of 804 is a new database of labeled titles using raw titles created from validated labeled titles from the reference database of 802.

In the example shown in FIG. 8, in 806, the remaining data of the reference database of 802 is converted to raw titles and normalized by applying the mass normalization techniques to the newly trained database of 804. As an example, the remaining raw titles sourced from the reference database of 802 are normalized and labeled using the new database of 804 to determine semantically equivalent titles.

In the example shown in FIG. 8, in 808, the results of 806 are analyzed by compared the results with the reference database in 802. In some embodiments, the labeled titles resulting from 806 are compared with the pre-validated labeled titles of 802 to determine the accuracy of the n-gram labeling process utilized in 804. The results reflect the accuracy of the n-gram labeling algorithm used to generate the newly trained database in 804. Using the feedback, the n-gram labeling process utilized in 804 can be tune. For example, the matching characteristic, the minimum number of parent n-grams, the maximum number of parent n-grams, and any other appropriate variables can be configured to improve accuracy.

In some embodiments, the results in 808 are categorized by the metrics precision and recall. The precision metric is used to quantify the occurrence of extraneous labels that are inherited and assigned to an n-gram by the n-gram labeling process. The recall metric is used to quantify missing labels that should be inherited and assigned to an n-gram but were not. By differentiating between extraneous and missing labels the system allows for more accurate tuning of the n-gram labeling algorithm. In some embodiments, the results of 808 include precision and recall metrics.

Figure 9:
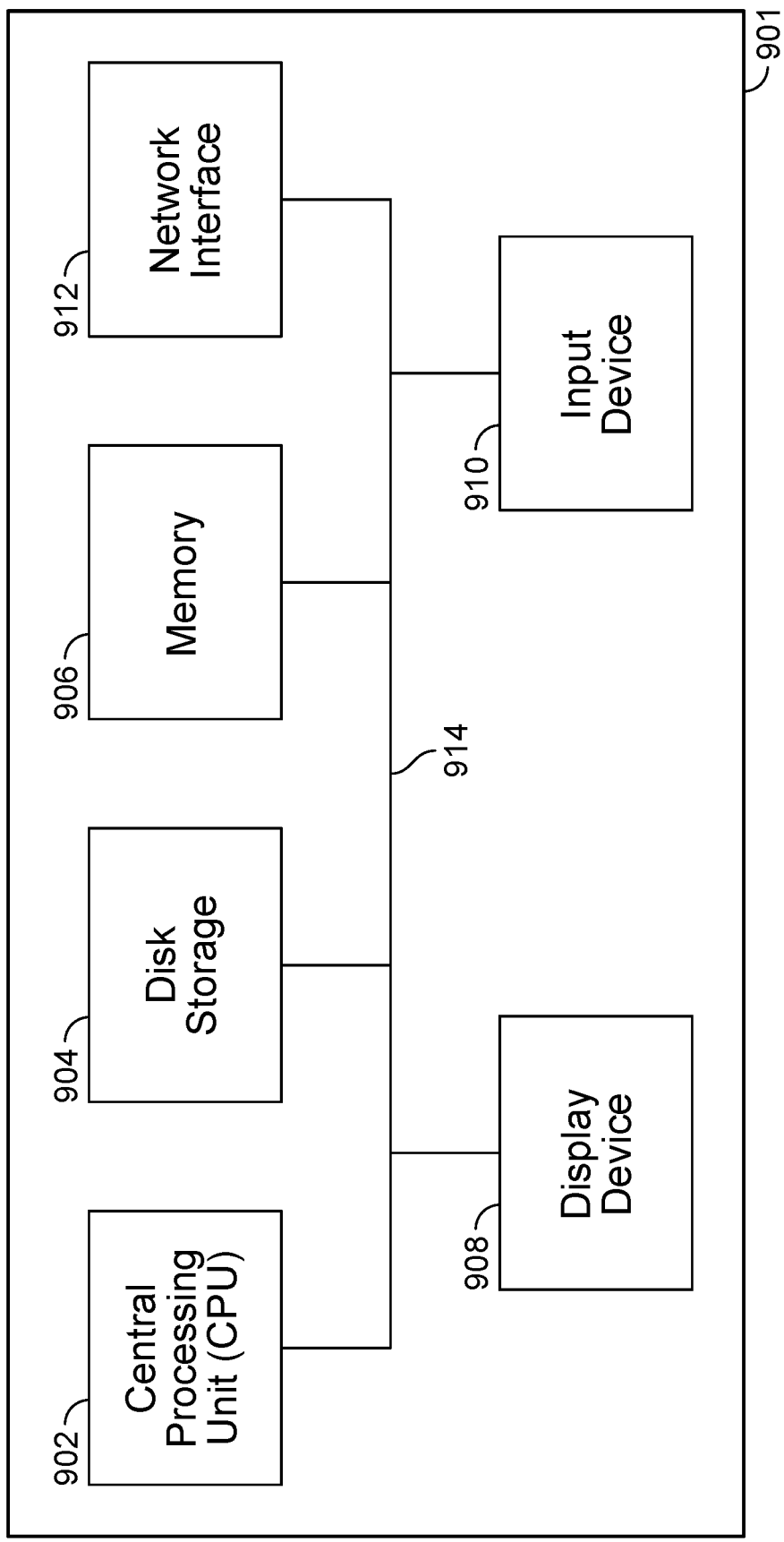
FIG. 9 is a block diagram illustrating an embodiment of a system for generating and validating a database of labeled foreign titles.

The techniques described above with respect to FIGS. 1A-8 may be implemented on a computer hardware platform. FIG. 9 is a block diagram illustrating an embodiment of a system for generating and validating a database of labeled foreign titles. The computer system 901 of FIG. 9 includes several standard components that may be used to perform certain aspects of the functionality associated with generating and validating a database of labeled foreign titles. Specifically, the computer system 901 includes a central processing unit (CPU) 902 to execute computer-readable instructions; non-transitory computer memory 906 to store computer-readable instructions; disk storage 904 for storing data and computer-readable instructions; a network interface 912 for accessing a network; a display device 908 for displaying system outputs; and an input device 910 for receiving input from a user. The CPU, memory, disk storage, display device, network interface, and input device units are connected by one or more bidirectional buses 914 that transmit data and/or computer-readable instructions between the units.

The computer system 901 of FIG. 9 may be used, for example, to implement mass normalization of titles and the generation of a database of labeled canonical titles as described with respect to FIGS. 1A-8. For example, a user may input an initial set of foreign canonical titles using the input device, and store these titles in disk storage. The CPU may be used to break titles into n-grams, and run graphical user interfaces that allow users to assign labels to n-grams or to run validation tools. The display may be used to view the hierarchy of titles during white-box validation, for example, or to display a list of user profiles that meet some criteria. The network interface may be used to access internal or external networks to retrieve user profiles, titles, or metadata, for example. The memory may be used to store computer programs for mapping labels from parent n-grams to intermediary n-grams, for example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating a database of labeled foreign titles comprising:
   an interface to receive a title in a second language; and
   a processor to:
      store n-grams each with associated labels in a first language in a first database, wherein the first language and the second language are different;
      sanitize the title in the second language into a sanitized title in the second language;
      translate the sanitized title in the second language into a translated title in the first language;
      break the translated title in the first language into intermediary n-grams in the first language;
      determine parent n-grams of an intermediary n-gram of the intermediary n-grams, wherein the intermediary n-gram is a sub-string of the parent n-grams;
      retrieve a set of labels associated with the parent n-grams using the first database, wherein the set of labels are in the first language; and
      in response to determining that a matching threshold of a label of the set of labels is met, assign the label to the intermediary n-gram, wherein the matching threshold is a frequency the label occurs in the set of labels associated with the parent n-grams, wherein assigning the label comprises storing the label in the first language in a second database, and wherein the second database stores the title in the second language and the intermediary n-gram in the first language.

2. The system of claim 1, wherein the first database stores a set of n-grams associated with a first language title of a set of first language titles.

3. The system of claim 2, wherein the set of n-grams comprises a set of unigrams, a set of bi-grams, or a set of tri-grams.

4. The system of claim 3, wherein each unigram is one word in the first language title, each bi-gram is two contiguous words in the first language title; and each tri-gram is three contiguous words in the first language title.

5. The system of claim 1, wherein the first database stores a set of attributes associated with an n-gram of the set of n-grams.

6. The system of claim 5, wherein the associated labels stored in the first database are assigned to an attribute of the set of attributes.

7. The system of claim 1, wherein the processor is further to generate a set of second language n-grams for the title in the second language.

8. The system of claim 7, wherein generating a set of second language n-grams for the title comprises:
   generating a set of second language unigrams, wherein each second language unigram is one word in the title;
   generating a set of second language bi-grams, wherein each second language bi-gram is two contiguous words in the title; and generating a set of second language tri-grams, wherein each second language tri-gram is three contiguous words in the title.

9. The system of claim 1, wherein the second database stores a set of second language n-grams for the title in the second language.

10. The system of claim 9, wherein the second database stores a set of attributes associated with the title in the second language.

11. The system of claim 10, wherein assigned labels stored in the second database are associated with an attribute of the set of attributes.

12. The system of claim 9, wherein the second database stores a set of attributes associated with a second language n-gram of the set of second language n-grams.

13. The system of claim 12, wherein the assigned labels stored in the second database are associated with an attribute of the set of attributes.

14. The system of claim 1, wherein sanitizing the title comprises one or more of the following: removing stop words, filtering characters, removing accents from characters, and tokenizing the title.

15. The system of claim 14, wherein tokenizing the title utilizes one or more of the following: word boundaries, whitespace, and a dictionary.

16. The system of claim 1, wherein sanitizing the title comprises filtering tokens.

17. The system of claim 16, wherein filtering tokens comprises identifying articles or conjunctions.

18. The system of claim 1, wherein the second database stores the sanitized title in the second language.

19. A method for generating a database of labeled foreign titles comprising:
receiving a title in a second language;
storing n-grams each with associated labels in a first language in a first database, wherein the first language and the second language are different;
sanitizing, using a processor, the title in the second language into a sanitized title in the second language;
translating the sanitized title in the second language into a translated title in the first language;
breaking the translated title in the first language into intermediary n-grams in the first language;
determining parent n-grams of an intermediary n-gram of the intermediary n-grams, wherein the intermediary n-gram is a sub-string of the parent n-grams;
retrieving a set of labels associated with the parent n-grams using the first database, wherein the set of labels are in the first language; and
in response to determining that a matching threshold of a label of the set of labels is met, assigning the label to the intermediary n-gram, wherein the matching threshold is a frequency the label occurs in the set of labels associated with the parent n-grams, wherein assigning the label comprises storing the label in the first language in a second database, and wherein the second database stores the title in the second language and the intermediary n-gram in the first language.

20. A computer program product for generating a database of labeled foreign titles, the computer program product being embodied in a non-transitory computer readable storage medium and comprising computer instructions for:
receiving a title in a second language;
storing n-grams each with associated labels in a first language in a first database, wherein the first language and the second language are different;
sanitizing, using a processor, the title in the second language into a sanitized title in the second language;
translating the sanitized title in the second language into a translated title in the first language;
breaking the translated title in the first language into intermediary n-grams in the first language;
determining parent n-grams of an intermediary n-gram of the intermediary n-grams, wherein the intermediary n-gram is a sub-string of the parent n-grams;
retrieving a set of labels associated with the parent n-grams using the first database, wherein the set of labels are in the first language; and
in response to determining that a matching threshold of a label of the set of labels is met, assigning the label to the intermediary n-gram, wherein the matching threshold is a frequency the label occurs in the set of labels associated with the parent n-grams, wherein assigning the label comprises storing the label in the first language in a second database, and wherein the second database stores the title in the second language and the intermediary n-gram in the first language.

* * * * *